No. 757,016. PATENTED APR. 12, 1904.
J. H. BLEOO.
TRIPLE VALVE FOR AIR BRAKE SYSTEMS.
APPLICATION FILED JUNE 11, 1903.
NO MODEL. 2 SHEETS—SHEET 1.
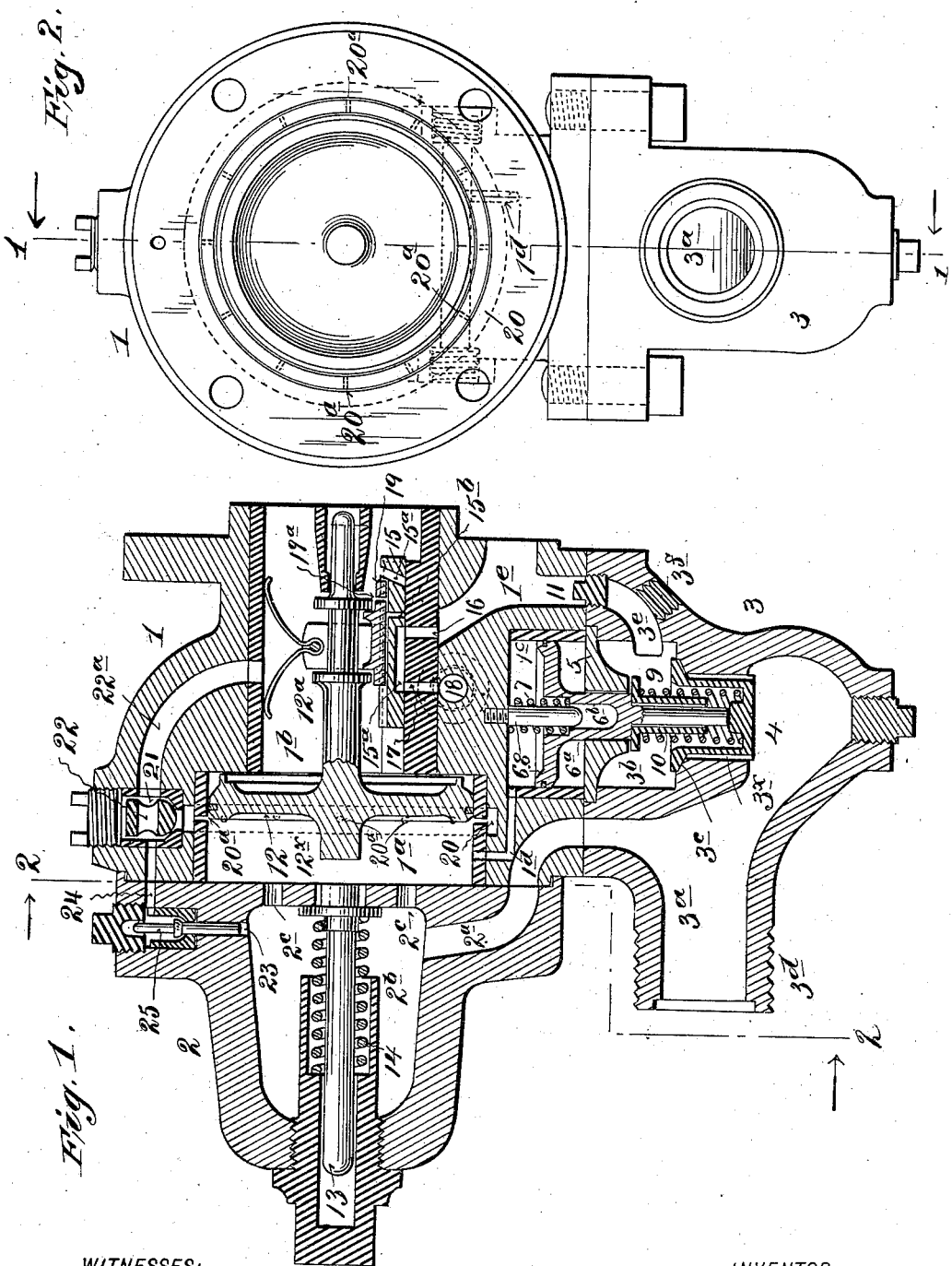

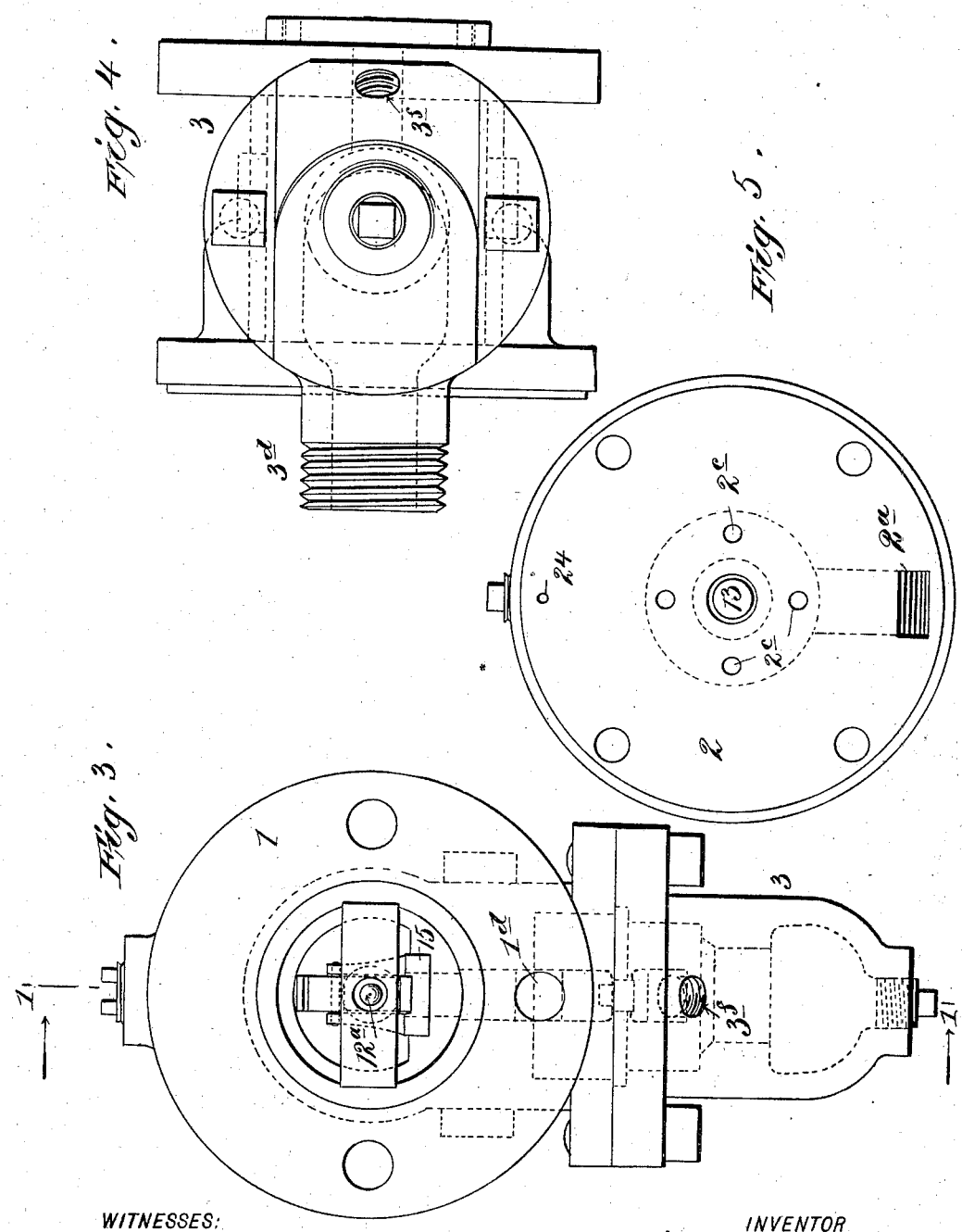

No. 757,016. Patented April 12, 1904.

UNITED STATES PATENT OFFICE.

JOHN H. BLEOO, OF NEW YORK, N. Y., ASSIGNOR TO ABRAHAM B. LEVY, OF NEW YORK, N. Y.

TRIPLE VALVE FOR AIR-BRAKE SYSTEMS.

SPECIFICATION forming part of Letters Patent No. 757,016, dated April 12, 1904.

Application filed June 11, 1903. Serial No. 161,003. (No model.)

*To all whom it may concern:*

Be it known that I, JOHN H. BLEOO, a citizen of the United States, residing in New York city, borough of Brooklyn, State of New York, (whose post-office address is Canarsie, New York,) have invented certain new and useful Improvements in Triple Valves for Air-Brake Systems, of which the following is a specification.

My invention relates to improvements in air-brake apparatus, and more particularly to the triple valves used therein; and the invention has for its object to provide a novel arrangement of emergency-valve for use in connection with the triple valve.

My invention is applicable to any well-known triple valve. I have shown my invention as applied to what is commonly known in the art as a "recharging" triple valve, and in carrying out my invention I provide a chamber in communication with the triple-valve-piston chamber, and in the first-named chamber I provide a piston adapted to coact with an emergency-valve that is acted upon by train-pipe pressure and adapted to control a passage communicating with the atmosphere or with a passage leading to the brake-cylinder, and the arrangements are such that when an emergency application of the brakes is desired the triple-valve piston will place the first-named chamber in communication with auxiliary air, and thus in communication with the brake-cylinder, whereby auxiliary-air pressure will cause the emergency-valve to close after the emergency-valve has opened to reduce the train-pipe pressure.

My invention also comprises the novel details of improvement and arrangements of parts that will be more fully hereinafter set forth and then pointed out in the claims.

Reference is to be had to the accompanying drawings, forming part hereof, wherein—

Figure 1 is a vertical section of a recharging triple valve embodying my invention, taken substantially on the line 1 1 of Fig. 2. Fig. 2 is an end elevation of the valve, substantially on the line 2 2 in Fig. 1, looking in the direction of the arrow, part being removed. Fig. 3 is an end elevation looking from the right in Fig. 1. Fig. 4 is an inverted plan view of the valve, and Fig. 5 is a face view of the part of the casing shown at the left of the line 2 2 in Fig. 1.

Similar numerals of reference indicate corresponding parts in the several views.

In the drawings, the numerals 1 2 3 indicate generally the main parts of the casing, which may be of well-known construction properly secured together.

The member 3 constitutes the emergency-valve body, and the same is provided with a chamber and passage $3^a$ for train-pipe air and a chamber $3^b$, communicating by a passage $3^\times$ with the chamber $3^a$ and controlled by a valve 4, adapted to open toward chamber $3^b$ and to close against a seat $3^c$. The member or body 3 is provided with means, such as threads $3^d$, for connection with a train-pipe. The member 2 is provided with a passage $2^a$, communicating with chamber $3^a$ and with a train-pipe-air chamber $2^b$, having ports $2^c$, communicating with triple-valve-piston chamber $1^a$ in member 1, the latter also having a chamber $1^b$, which contains the triple slide-valve. The member 1 also has a chamber $1^c$, that communicates by a port or passage $1^d$ with the chamber $1^a$. The chambers $3^b$ and $1^c$ are separated by a partition 5, which also serves as a guide for the stem $6^a$ of a piston 6, located in chamber $1^c$. The stem $6^a$, reduced in size, passes into chamber $3^b$ and rests upon valve 4, as shown in Fig. 1. At 7 is indicated a spring, acting upon piston 6, serving to depress the same by bearing against the upper wall of chamber $1^c$, as shown, surrounding a pin 8, that enters a socket $6^b$ in piston 6. The valve 4 is shown as also held upon its seat $3^c$ by a spring 9, entering said valve to bear against the same and also bearing against a holder or guide 10, shown receiving stem $6^a$, and which also serves as a stop to limit the upward movement of valve 4. The holder 10 may bear at its upper end against the partition 5. The chamber $3^b$ communicates with a passage $3^e$ in member 3, which communicates by port $3^f$ with the atmosphere or with a passage $1^e$ in member 1, that is to communicate with the brake-cylinder (not shown) in well-known manner. The communication between passages $1^e$ and $3^e$ may be closed by a plug 11, whereby air from chamber $3^b$ may pass through port $3^f$ to the atmosphere, or the plug may be placed in port $3^f$ and removed from $3^e$ to permit air to pass from chamber $3^b$ to passage $1^e$.

The emergency-valve arranged as above described may be used in connection with any well-known triple valve applicable to air-brake systems, and for convenience I have shown my invention as applied to a recharging triple valve, which may be described as follows: At 12 is a piston, located in chamber $1^a$, normally to the right of port $1^d$, as in Fig. 1, and having its stem $12^a$ guided within chamber $1^b$ in well-known manner, and said piston is adapted to operate a spring-pressed pin or plunger 13, shown located in chamber $2^b$, a spring 14 serving as the usual graduating-spring. At 15 is indicated a slide-valve having a cavity $15^a$, adapted to communicate with a port 16, that leads from passage $1^e$, and a port 17, that communicates with exhaust-passage 18, leading to the atmosphere, and valve 15 has ports $15^a$ $15^b$ to communicate with port 16. At 19 is indicated a slide-valve having a port $19^a$, adapted to register with port $15^b$. Stem $12^a$ is arranged to operate said valves, and as the above parts are well known they need no further description. At 20 is a cavity or passage communicating through ports $20^a$ with chamber $1^a$, and cavity 20 communicates with a chamber 21, containing a check-valve 22, a chamber 21 connecting by a passage $22^a$ with chamber $1^b$. Chamber $2^b$ communicates by ports 23 and 24 with chamber 21, a recharging-valve 25 controlling said ports, all being of well-known construction.

The operation of my improvements, in connection with the triple valve above described, is as follows: Train-pipe air at a suitable pressure—say seventy pounds to the square inch—enters chamber $3^a$ and passes through passage $2^a$ into chamber $2^b$ and thence through ports $2^c$ to piston-chamber $1^a$ and through port or passage $1^d$ to chamber $1^c$ upon piston 6, and such air also passes through ports $20^a$ to cavity or chamber 20, unseating check-valve 22 and passing through passage $22^a$ to slide-valve chamber $1^b$ and an auxiliary reservoir connected therewith and in open communication with chamber $1^b$, at all times in well-known manner. The air also passes through port 23, unseating recharging check-valve 25, and through port 24 to and around check-valve 22. According to the foregoing it will be understood that there is an uninterrupted flow of air at train-pipe pressure throughout the mechanism shown, being on both sides of piston 12, in chamber $1^c$, and on top of piston 6 of the emergency-valve and under check-valve 4 in chamber $3^a$. As stem $6^a$ bears on check-valve 4 the downward stroke of the piston is limited, said valve receiving the downward pressure of spring 7 plus the pressure of spring 9, thereby insuring the seating of valve 4, while both are also operative independently of each other. Therefore the pistons 6 and 12 and the valve 4 normally remain, as shown, in full-release and running positions.

For a service application or gradual stop the operation is as follows: Upon reduction of pressure in the train-pipe—say about five to ten pounds—the brakes are set gently either to slow the train or stop it smoothly, and check-valve 22 and recharging-valve 25 are then seated by auxiliary-reservoir pressure (through passage $22^a$ and 24) and piston 12 is forced to the left in Fig. 1 by the auxiliary-reservoir pressure until its projection $12^x$ engages graduating-pin 13 and its further travel is checked by graduating-spring 14, and thereupon ports $19^a$, $15^b$, and 16 are brought in register, admitting air from chamber $1^b$ to the passage $1^e$ and thence to the brake-cylinder, causing the brakes to be set as desired. At such time of application of the brakes the emergency-valve 4 remains inactive, as the reduction in train-pipe pressure above mentioned did not change the air-balance upon piston 6 and beneath check-valve 4, because piston 12 did not pass over port $1^d$. The train having been stopped or slowed, the brakes may be released by next admitting reservoir-air pressure at, say, seventy pounds or more through the train-pipe to chambers $3^a$, $2^b$, and $1^a$, thereby forcing piston 12 and slide-valve 15 19 to the right in Fig. 1, (the air-pressure in chamber $1^b$ and auxiliary reservoir having been reduced in applying the brakes,) thereby bringing ports 16 and 17 in register with cavity $15^a$ of the slide-valve, permitting the air from the brake-cylinder to escape through passage $1^e$ and said ports and cavity to the atmosphere through passage 18, thereupon restoring the air-pressure throughout the system to the normal—say seventy pounds.

For an emergency application of the brakes or a sudden stop a quick reduction of train-pipe pressure — say from ten to twelve pounds—is made, thereby causing piston 12 to rapidly move in chamber $1^a$ beyond the port or passage $1^d$, (compressing spring 14,) so as to place chambers $1^b$ and $1^c$ in direct communication with each other, and thereby bringing port $15^a$ of slide-valve 15 and port 16 in register, admitting air from chamber $1^b$ and the auxiliary reservoir to the brake-cylinder. During such travel of piston 12 the air is drawn from chamber $1^c$ by the reduction of pressure in chamber $1^a$, and the piston covers port $1^d$, (there being comparatively no volume of air now in chamber $1^c$,) and thus there is a reduction of pressure on piston 6, and while port $1^d$ is thus covered the surging air of great volume in the train-pipe acts directly and suddenly upon valve 4, which is thereupon momentarily forced from its seat $3^c$ by the train-pipe pressure in chamber $3^a$, thus causing a rush of air in relatively great volume past check-valve 4 into chamber 9 and through passage $3^e$ to the brake-cylinder (if plug 11 is not interposed and is in port $3^f$) or to the atmosphere if the passage $3^e$ is plugged and port $3^f$ open. The brakes now being set to the greatest force, the auxiliary pressure of seventy pounds has been reduced by the area of the brake-cylinder to, say, fifty pounds to the square inch, and as the brake-cylinder, the auxiliary reservoir, chamber $1^b$, passage $1^d$, and emergency-piston chamber $1^c$ are then in open communication, while piston 12 is at its full travel to the left only, they must be under the same pressure, whereby piston 6 will be forced downward, springs 7 and 9 insuring the closing of check-valve 4. Then when reservoir-pressure is again admitted to the train-pipe the piston 12 and its valves will be forced back to the normal position. (Shown in Fig. 1.) The above effects take place first in the triple valve nearest the engineer's valve, and as soon as the valve 4 in such triple valve operates to permit air to pass it a reduction in air-pipe pressure will thereby be caused on the side toward the next triple valve, causing similar operations therein, and so on throughout the system, whereby quick action of all the triple valves in a train is effected.

The details of construction shown and described may be varied without departing from the spirit of my invention.

Having now described my invention, what I claim is—

1. The combination of a triple valve, with an emergency-valve having a chamber normally maintained by a port in communication with the piston-chamber of the triple valve on the train-pipe side of said piston to permit auxiliary air to act to close the emergency-valve after the triple-valve piston has moved for an emergency application, substantially as described.

2. The combination of a triple valve, with an emergency-valve in open communication with train-pipe air that communicates with the triple valve by a port leading to the piston-chamber of the triple valve on the train-pipe side of the piston and arranged to be covered and uncovered by said piston for placing said emergency-valve in communication with auxiliary air when an emergency application or stop is made, substantially as described.

3. The combination of a triple valve, with an emergency-valve adapted to control the passage of train-pipe air, and means for placing the emergency-valve in communication with auxiliary air to cause auxiliary-air pressure to close said valve when an emergency application or stop is made, substantially as described.

4. The combination of a triple valve, with an emergency-valve in communication with train-pipe air on the train-pipe side of the triple-valve piston, a piston for said emergency-valve, means for normally maintaining equal pressure upon said valve and piston, and means for reducing pressure on one side of the piston to permit said valve to operate for an emergency application and to cause auxiliary air to close said valve, substantially as described.

5. The combination of a triple valve provided with a piston, with an emergency-valve to control train-pipe pressure, a piston for said valve within a chamber that communicates by a passage with train-pipe air, said passage being arranged to be placed in communication with auxiliary air by the piston of the triple valve upon an emergency application, whereby auxiliary-air pressure will close the emergency-valve, substantially as described.

6. The combination of a triple valve, with an emergency-valve communicating with train-pipe air and adapted to normally close a chamber that communicates with a passage leading to a brake-cylinder or atmosphere, a port connecting the triple-valve-piston chamber on the train-pipe side of the piston with the emergency-valve on the side opposite the direct pressure of train-pipe air, said port being in position to be closed by said piston upon the reduction of train-pipe air for an emergency application, the piston being arranged to open said port upon further movement to place said port in communication with auxiliary air, substantially as described.

7. The combination of a triple valve provided with a piston, with an emergency-valve in communication with a chamber that communicates with a passage to permit the escape of train-pipe air, a piston to coact with the emergency-valve, and a chamber for said piston in communication with a chamber of the triple valve, whereby in normal positions the emergency-valve and its piston will have balanced pressure thereon and upon movement of the triple-valve piston the chamber of the emergency-valve piston will be placed in communication with auxiliary air, substantially as described.

8. An emergency-valve in combination with a triple valve in free and open connection with train-pipe air on the train-pipe side of the triple-valve piston without any intervening valves controlling said emergency-valve, the triple-valve piston being arranged to place one side of the emergency-valve in communication with auxiliary air upon an emergency application, substantially as described.

JOHN H. BLEOO.

Witnesses:
HENRY STORCK,
SAMUEL SWANSON.